(12) United States Patent
Heimdal et al.

(10) Patent No.: US 9,919,244 B2
(45) Date of Patent: Mar. 20, 2018

(54) SUBMERGED CLARIFIER LAUNDER

(71) Applicant: Ovivo Inc., Montreal (CA)

(72) Inventors: Tor Heimdal, Salt Lake City, UT (US);
John Vorwaller, Salt Lake City, UT (US); Hugh Ryan Clark, Lehi, UT (US); Todd Kline, Salt Lake City, UT (US); Ralph Petrone, South Jordan, UT (US); Bruce A. Hugo, Sandy, UT (US); Roger Peters, Salt Lake City, UT (US); Tyson Beaman, Taylorsville, UT (US)

(73) Assignee: Ovivo Inc., Montreal QC (CA)

( * ) Notice: Subject to any disclaimer, the term of this patent is extended or adjusted under 35 U.S.C. 154(b) by 0 days.

(21) Appl. No.: 15/063,397

(22) Filed: Mar. 7, 2016

(65) Prior Publication Data
US 2017/0252673 A1 Sep. 7, 2017

(51) Int. Cl.
*B01D 21/24* (2006.01)
*B01D 21/00* (2006.01)

(52) U.S. Cl.
CPC ..... *B01D 21/0006* (2013.01); *B01D 21/0003* (2013.01); *B01D 21/0042* (2013.01); *B01D 21/2444* (2013.01); *Y02W 10/37* (2015.05)

(58) Field of Classification Search
CPC ............ B01D 21/0003; B01D 21/0042; B01D 21/02; B01D 21/2444
USPC .................................................. 210/521, 540
See application file for complete search history.

(56) References Cited

U.S. PATENT DOCUMENTS

| 1,741,187 | A | * | 12/1929 | Fuqua | B01D 17/0208 210/519 |
| 3,447,688 | A | * | 6/1969 | MacCabe | B01D 21/2444 210/540 |
| 3,774,770 | A | * | 11/1973 | Sparham | B01D 21/0012 210/527 |
| 4,009,106 | A | | 2/1977 | Smith | |
| 4,059,529 | A | | 11/1977 | McGivern | |
| 4,994,179 | A | * | 2/1991 | Keeter | B01D 21/2444 210/540 |

(Continued)

FOREIGN PATENT DOCUMENTS

DE 19520565 * 10/1995
GB 2115304 A 9/1983

*Primary Examiner* — Christopher Upton
(74) *Attorney, Agent, or Firm* — Thomas M. Freiburger

(57) ABSTRACT

A clarifier in a wastewater treatment plant is provided with a submerged launder for effluent, the launder preferably having an integral density current baffle and scum baffle. In one embodiment an existing launder is modified, with its vertical leg replaced with a sloped plate defining launder conduit triangular in cross section, and with a sloping portion of the plate forming a density current baffle. Openings in the sloped plate permit entry of effluent liquid, and the liquid level in a clarifier is controlled without an overflow weir plate. In another form submerged pipe with entry holes serves as the launder, with support brackets integral with a density current baffle. A third form of the launder is a box formed beneath the shelf of an existing internal launder in the clarifier, again with a density current baffle extending down from the box. In another version an existing launder is covered and sealed, and holes are drilled through the launder wall to admit effluent. A submerged launder avoids problems of algae buildup and the need for algae sweeps or frequent cleaning of the launder.

12 Claims, 7 Drawing Sheets

(56) References Cited

U.S. PATENT DOCUMENTS

| | | |
|---|---|---|
| 5,227,077 A | 7/1993 | Shea |
| 5,252,205 A | 10/1993 | Schaller |
| 5,423,986 A * | 6/1995 | Valentin ............. B01D 21/2444 |
| | | 210/540 |
| 5,552,050 A * | 9/1996 | Valentin ............. B01D 21/2444 |
| | | 210/540 |
| 5,597,483 A | 1/1997 | Schaller |
| 6,193,888 B1 | 2/2001 | Do |
| 6,712,222 B2 | 3/2004 | Schaller |
| 7,243,802 B2 | 7/2007 | Albertson |
| 7,416,662 B2 | 8/2008 | Aditham et al. |
| 7,722,776 B2 * | 5/2010 | Essemiani .......... B01D 21/0042 |
| | | 210/521 |
| 8,083,075 B2 | 12/2011 | Schaller et al. |
| 8,220,644 B2 | 7/2012 | Schaller |
| 2012/0248036 A1 | 10/2012 | Schaller |

* cited by examiner

SUBMERGED CLARIFIER LAUNDER

BACKGROUND OF THE INVENTION

This invention concerns wastewater treatment plants, particularly clarifiers, and is directed to an improved clarifier launder construction that eliminates algae buildup and the need for algae sweeps, launder covers or frequent cleaning.

Clarifier launders typically are formed by a shelf of concrete, L-shaped in cross section and integral with the wall, on the inside or the outside of the clarifier wall. They can also be of other materials such as steel or FRP (fiberglass reinforced plastic). If inside, the conventional launder provides with its vertical leg a weir for overflow of effluent liquid into the launder with a weir plate attached to the top of the vertical leg. In an external concrete launder the top edge of the clarifier with weir plate attached provides the overflow weir.

Algae growth is a recurrent problem in conventional clarifier effluent launders. The launders are exposed to daylight, promoting algae growth, and must be cleaned frequently to remove the algae growth. Sometimes effluent launder algae sweeps have been installed, at significant capital and operational costs. Without these sweeps, plant operators must frequently clean the launders. In some cases effluent launder covers have been used to eliminate light and prevent algae growth.

The following documents have some relevance to the current invention: U.S. Pat. Nos. 8,220,644, 8,083,075, 7,416,662, 7,243,802, 6,712,222, 6,193,888, 5,597,483, 5,252,205, 5,277,077, 4,059,529 and 4,009,106, U.S. Pub. No. 2012/0248036 and British Patent No. GB 2115304. Of these references, U.S. Pat. No. 8,220,644, shows a somewhat typical inboard launder construction with density current baffle and scum baffle.

SUMMARY OF THE INVENTION

The present invention differs from previously known solutions to these problems by eliminating costs associated with effluent launders, weir plates and scum baffle plates, launder covers and/or algae sweeps. The current design requires fewer components to perform the same functions, while also eliminating the problem of algae buildup that required periodic cleaning of the launders by plant operators or continual cleaning by algae sweeps installed in the launders.

In one preferred form the submerged effluent launder of the invention comprises a modified density current baffle. A density current baffle in conventional construction is typically attached to the clarifier tank wall about one-half to two-thirds of the side water depth from the tank floor or to the bottom corner of the launder. In conversion of the density current baffle to a submerged effluent launder in this embodiment of the invention, the inwardly/downwardly angled density current baffle is extended and elevated such that the highest point of the angled plate is attached to the tank wall below the clarifier liquid level. A vertical mounting plate at top of the angled plate extends up to or above liquid level and is attached to the wall. Also, the density current baffle is modified by adding a horizontal shelf that extends from the clarifier tank wall to the inside of the density current baffle, thus defining a triangular cross section submerged effluent launder. Orifices are formed in the angled wall of the density current baffle, at an elevation below the liquid level and preferably just above the horizontal shelf of the submerged launder. The submerged effluent exit minimizes or eliminates sun exposure and prevents algae growth.

In another embodiment a clarifier with existing internal launder is modified by removing the vertical leg of the L-shaped launder, and the remaining shelf becomes the bottom horizontal leg of the triangular cross section launder as described above. Brackets secure the angled launder top/density current baffle to the clarifier wall at top and to the edge of the shelf.

The submerged effluent launder operates hydraulically as a substantially or completely full conduit, with liquid level in the clarifier controlled by monitoring plant influent flow rate or monitoring liquid level in the clarifier and controlling the level by an automatic weir elsewhere in the launder, or by an automatic valve in the effluent pipe. For all iterations of the submerged effluent launder a level monitoring/control system must be in place. An example of this is by monitoring the flow into the clarifier and adjusting an effluent weir or valve. Another example of this is to have sensors monitoring the liquid level that again would adjust an effluent weir or valve to control water level elevations.

Accordingly, the submerged clarifier launder of the invention can be in several forms, some of which involve an existing internal launder and others not, such as in new construction. One embodiment employs a submerged pipe with openings that admit effluent, the pipe secured to a mounting structure that includes a density current baffle. The need for a scum baffle is eliminated in most cases, in that the liquid exits not over a weir but via submerged openings into the launder, while scum remains on the liquid surface.

Significant construction and maintenance costs are eliminated with the submerged clarifier launder embodiments of the invention, and the algae buildup problem is overcome. These and other objects, advantages and features of the invention will be apparent from the following description of a preferred embodiment, considered along with the accompanying drawings.

DESCRIPTION OF PREFERRED EMBODIMENTS

Figure 1:
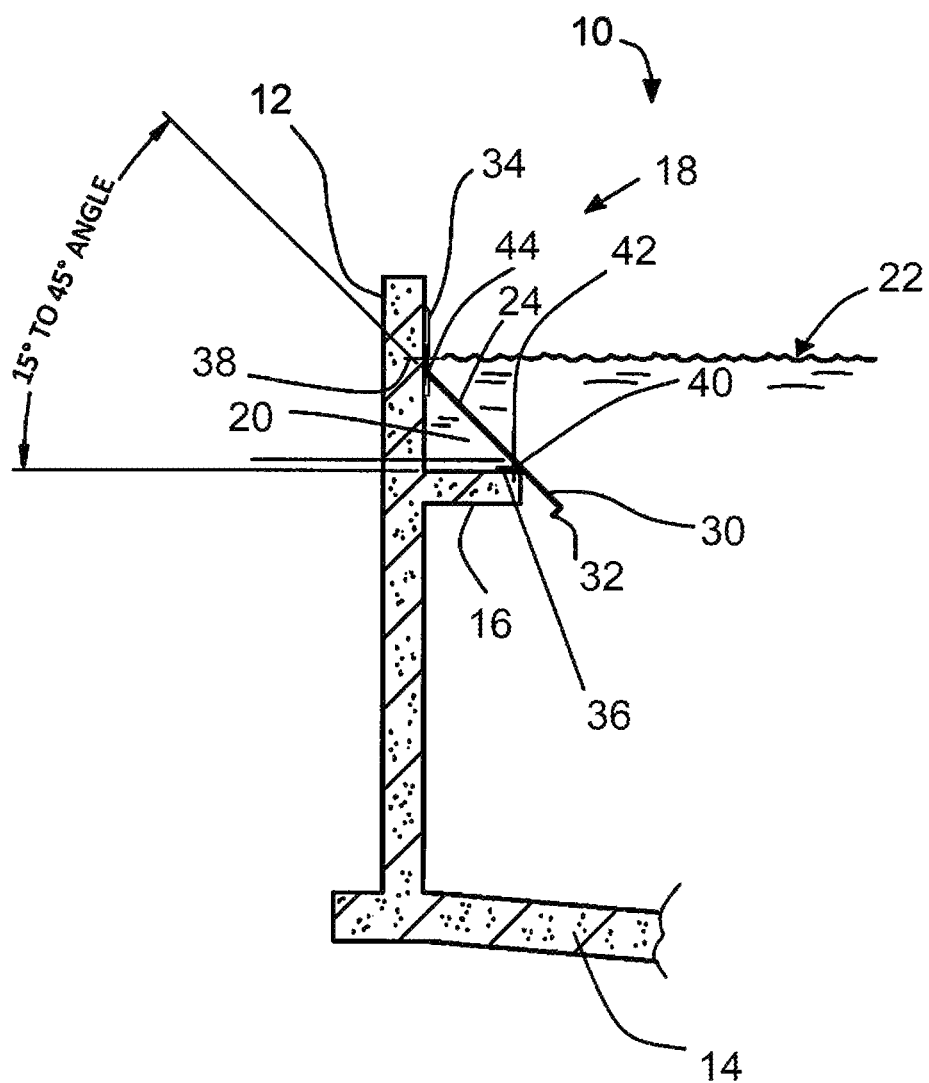
FIG. 1 is a schematic cross section in elevation showing an outer portion of a clarifier modified according to one embodiment of the invention.

FIG. 1 shows an existing clarifier 10, typically of concrete but possibly of other material such as steel, in a partial cross section, including the outer wall 12 of the clarifier and a portion of the clarifier floor 14. The clarifier had an existing internal launder, but the vertical leg of the launder has been removed, leaving the horizontal shelf 16. This form of the invention replaces the conventional launder with a submerged effluent launder 18. The launder is formed as a hydraulic conduit 20 triangular in cross section as indicated in this schematic drawing. Liquid level of the clarifier is approximately at 22, and freely contacts the outside surface of an obliquely angled plate 24 forming the upper side of the new launder. In another implementation of the invention the liquid level can be lower.

The plate 24 preferably comprises an integral plate that includes a downwardly/inwardly sloping density current baffle 30, as shown. Proportions can be different than illustrated in FIG. 1; the density current baffle 30 can extend down farther if desired. The lower end of the baffle 30 may include an angled lip 32. The upper end of the plate 24 may include an extended vertical mounting plate 34 which allows the clarifier to operate at the original liquid level 22. In this scenario the scum baffle 26 can be eliminated, and the upper vertical plate 34 can act as a smooth surface for typical neoprene skimmers to remove scum.

The plate unit 24 extends around the entire periphery of the clarifier, assembled in sections. It is attached via integral vertical and horizontal plates indicated at 34 and 36, to the wall and shelf of the clarifier, using bolts such as indicated at 38 and 40. Access to the shelf bolt 40 would be difficult or impossible, but effluent holes into the launder are provided through the plate at 42. These can be, for example, two inch diameter holes through the plate, approximately two to three inches above the shelf, spaced at 30 inches from hole to hole. Each shelf bolt 40 is at the same position as the effluent hole 42, so that tool access to the bolt 40 is provided, for securing the brackets 36.

Preferably a vent hole is included near the top of the plate, approximately at the position 44 shown in the drawing, so that rising of the liquid level inside the launder will not be inhibited. In addition, the vent hole(s) will assist in draining the launder when clarifier is taken down for servicing.

As indicated in FIG. 1, the obliquely angled plate 24 can be at an angle of about 15° to 45° from horizontal.

Figure 2:
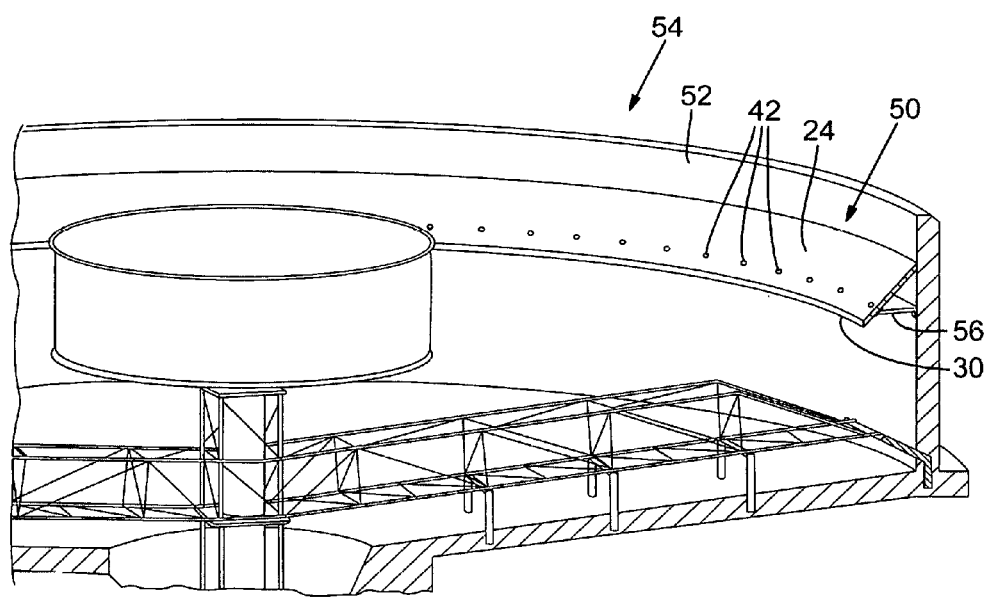
FIG. 2 is a perspective view with a cross-sectional cut showing another embodiment of the invention.

FIG. 2 shows another embodiment of a triangular cross section effluent launder 50 of the invention, installed on the outer wall 52 of a clarifier 54. This form of the invention is adapted for new construction, or can be added on the interior of a clarifier wall that has an existing external launder. In this case the plate at 24 can be similar to what was described relative to FIG. 1. The plate 24 can be stainless steel or other corrosion resistant metal, or it could be fiberglass reinforced plastic (FRP). A shelf 56, which can be of similar material, is installed horizontally as shown between the clarifier wall 52 and the under surface of the launder plate 24. As in FIG. 1, this launder assembly includes an integral density current baffle 30. Holes for entry of effluent liquid to the launder are shown at 42, located just above the internal floor of the triangular launder conduit. The launder shelf or bottom 56 can be secured to the plate 24 by appropriate fasteners or by welding, and the shelf can be secured to the clarifier wall via an L-shaped flange on the shelf at the wall. However, the entire launder/density current baffle assembly could be formed as a single integrally molded unit such as from FRP. Vent hole(s) can be included in the plate 24 at a similar position as discussed above regarding FIG. 1, for the same purposes stated there.

Figure 3:
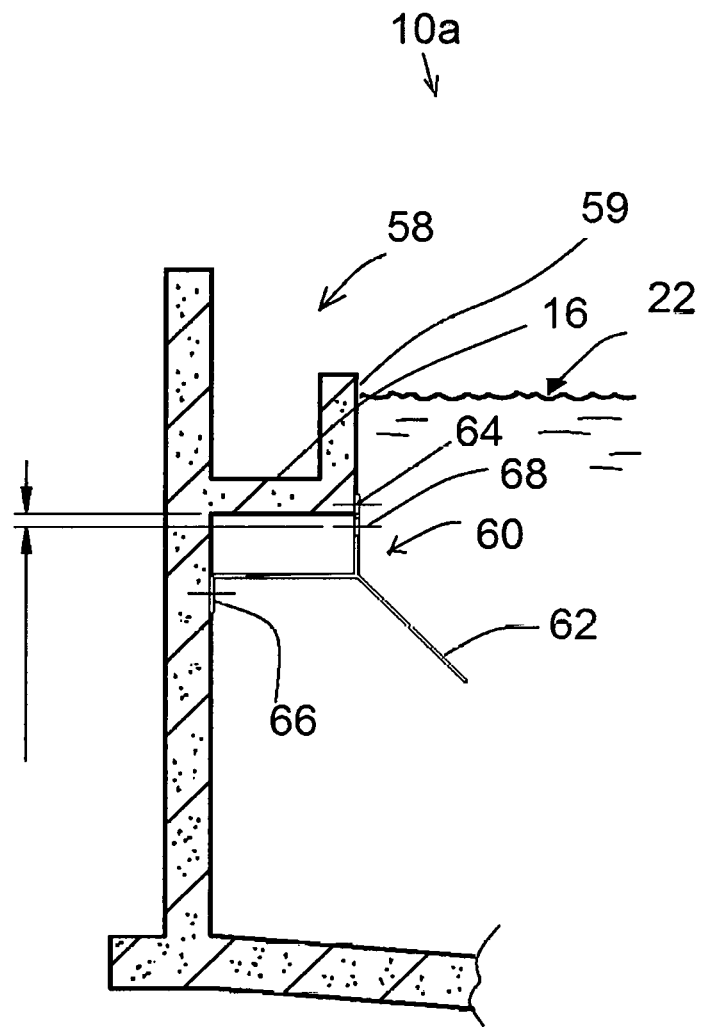
FIG. 3 is a schematic section view similar to FIG. 1, showing a third embodiment of the invention.

FIG. 3 shows another variation, on a clarifier 10a having an existing internal launder 58 which would be the same as was existing prior to the modifications shown in FIG. 1, including a vertical leg 59. A submerged launder in the form of a rectangular box 60 is installed beneath the existing launder shelf 16. The box can comprise simply an L-shaped attachment, but preferably also including a density current baffle 62 as shown. As above, the submerged effluent launder 60 can be integrally formed of FRP to include the density current baffle 62, or could be formed individually and assembled. The L-shaped portion has an upper mounting bracket 64 and a lower mounting bracket 66, both of which can be continuous, and the unit is secured to the existing structure in substantially sealed relationship, as also is the case with forms shown in FIGS. 1 and 2.

A series of liquid entry orifices 68 in the unit 60 are positioned just below the existing shelf 16 or at a level as desired in the launder unit. These orifices also serve as vents to facilitate draining when needed for service.

Figure 4:
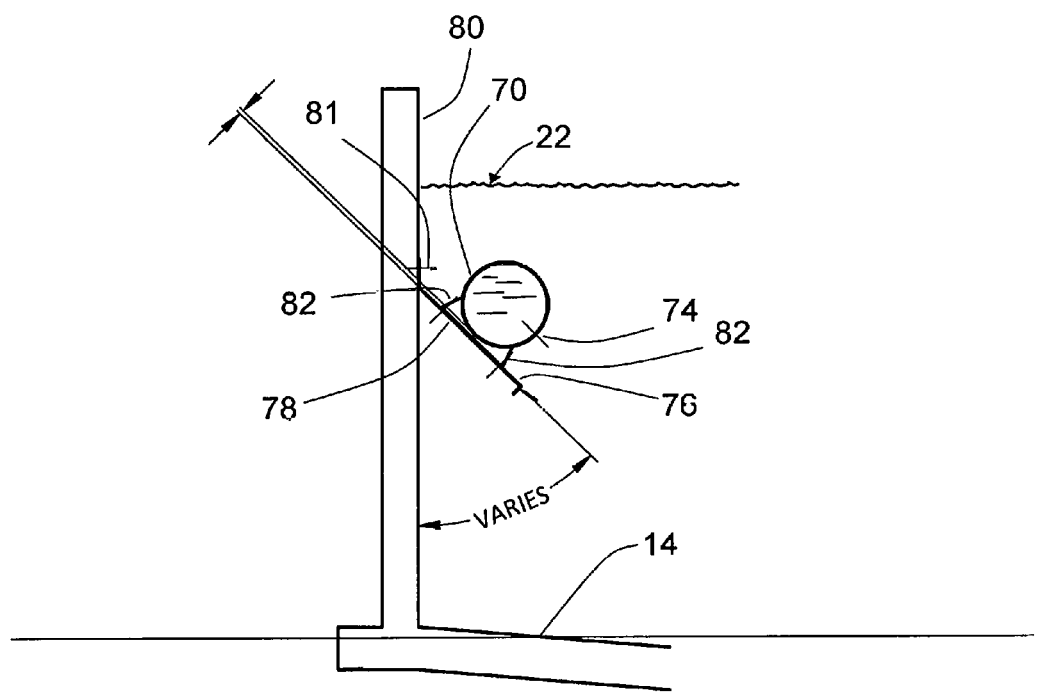
FIG. 4 is a section view similar to FIG. 1, showing a fourth embodiment of the invention.

FIG. 4 shows another form of the invention, in the form of a submerged effluent pipe 70 that forms the submerged launder. This form of the invention, shown also in FIG. 5, can be used on a newly constructed clarifier or on an existing clarifier with an external launder 72, such as shown in FIG. 5.

Figure 5:
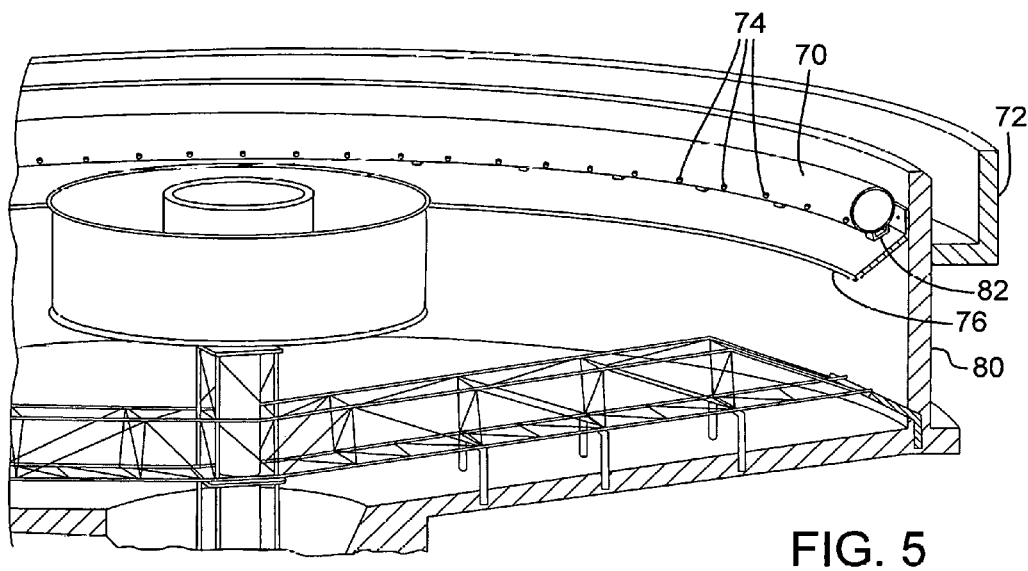
FIG. 5 is a perspective view with a sectional cut, showing the embodiment of FIG. 4 applied to a clarifier with an existing launder.

The conduit or pipe 70 has orifices positioned as desired, such as at locations indicated at 74 (which can be about 2 inch diameter) in FIGS. 4 and 5. The pipe 70 itself can be, as an example, about 20 inches in diameter for a 100-foot diameter clarifier tank.

This embodiment includes a density current baffle 76, similar to those discussed above, but the baffle 76 is a part of a mounting structure 78 for the pipe 70. This structure 78 preferably is continuous from the clarifier wall 80 to the lower end of the baffle 76, for function as a density current baffle, which should not allow throughflow except that vents can be included at the top of the density current baffle (near the wall 80) to prevent gas buildup. This structure is secured to the clarifier wall by bolts as indicated at 81, and includes or supports a pipe saddle 82 that firmly retains the pipe 70 to the mounting structure 78. One or more vent holes preferably are located at top of the pipe so that a rising level of liquid inside the launder will not be inhibited, and the vent will facilitate draining the launder pipe when taken down for service.

In this form of submerged launder, a gap may be provided between the pipe 70 and the angled platform structure 78, to allow the settling solids to pass through and slide down the angled platform 78.

Figure 6:
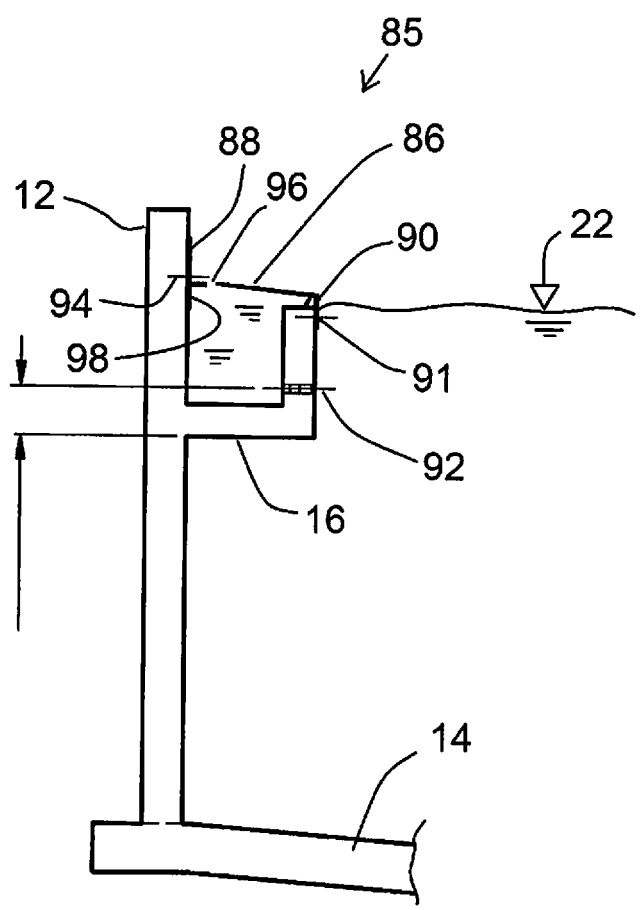
FIG. 6 is a section view similar to FIG. 1, showing a further embodiment of a submerged effluent launder.

FIG. 6 shows another embodiment of the invention, with a retrofitted submerged effluent launder shown at 85. This is an adaptation of an existing internal launder of a clarifier, typically of concrete, including a horizontal shelf 16 and vertical leg 59 that defined the existing launder along with the external clarifier wall 12.

In this form of submerged launder of the invention a top plate 86 is affixed at the top of the existing launder as shown, in sealed relationship. Typically neoprene material is engaged between the cover 86 and the existing concrete surfaces (and the same or similar sealing material can be used for sealing purposes in the earlier-described embodiments). The plate preferably is angled as shown, declining inwardly so as not to trap rain, etc. The top plate 86 forms a closed conduit, i.e. a fully or partly submerged effluent launder, preferably positioned about at or close to the liquid surface 22 in the clarifier. At least part of the launder must be submerged. As shown, the added plate 86 can have vertical plates, preferably integral, at both inner and outer sides. At the outer side is a continuous plate or flange 88 that engages with the tank wall 12, for bolting at intervals to the wall, and at the inner side is a depending plate 90 that laps over and against the existing concrete launder leg 59. This vertical plate 90 provides a closure, provides for affixing the top plate to the leg via bolts 91, and also acts an integral scum surface, i.e. a smooth surface for the skimming mechanism to ride against in order to efficiently remove scum from the surface. The preferred clarifier liquid level is indicated at 22, and the plate 90 preferably extends about four inches above the existing liquid level.

Effluent liquid enters the launder 85 via openings 92 through the vertical leg 59 as shown. These orifices can be about 2 inches in diameter, for example, formed by drilling, and spaced apart at appropriate intervals such as every 2 to 3 feet, depending in part on orifice size. The depth location of the orifices 92 can vary, and the orifices could be through the bottom 16, but that is not preferred.

The plate or flange 88 at the upper/outer end of the sloped top cover 86 provides for mounting that side of the cover plate 86 to the clarifier wall 12 (with bolts 94). A vent orifice 96 can be formed (at intervals) through the plate 86 near the upper side, the orifice oriented at an angle (up and to right in the drawing) so that any sunlight will only enter high in the launder. A downwardly extending vertical plate 98 can be included, extending down against the wall 12, for any sunlight contact. The plate if a smooth surface of FRP discourages algae growth.

In this embodiment the launder 85 will typically be partially submerged in the clarifier, not fully. The liquid level in the clarifier (and in the launder) can be about as shown so that the surface 90 acts as a scum cleaning surface. In all forms of the invention the launder is fully or partially submerged. The forms shown in FIGS. 1-5 can be fully submerged, or submerged at least to the extent that the effluent is evacuated efficiently and the effluent openings are submerged far enough that sunlight will not be able to encourage algae growth. Typically this should be roughly 16 inches to 20 inches below the clarifier liquid surface. In all embodiments the launder should be at least about 50% submerged, based on the internal height of the launder.

Figure 6A:
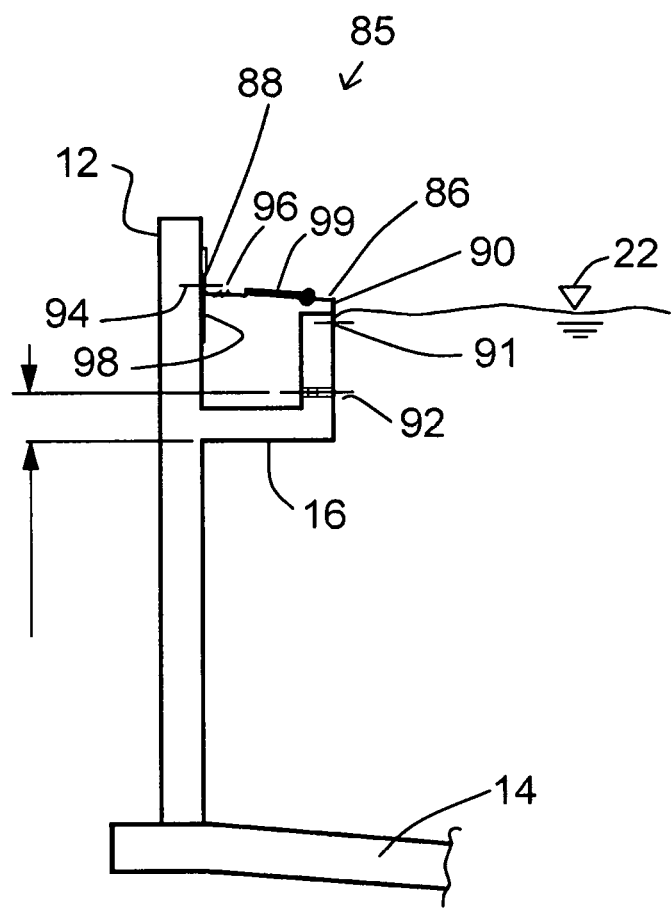
FIG. 6A is a section view similar to FIG. 6, with a variation.

FIG. 6A shows a variation of FIG. 6, in which an effluent inspection cover 99 is included in the top plate 86. This hinged viewer port plate, which can be up to a few feet wide, is only needed at one location. It can be provided in one section of many assembled sections that form the launder.

Note that the FIG. 6 embodiment can also be applied to an existing external launder, with effluent entry holes drilled through the clarifier wall.

The several embodiments of submerged clarifier launders described above eliminated algae problems, the cost of cleaning or algae sweeps, and reduce capital expense in forming a conventional clarifier launder in a newly-constructed clarifier.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. In a wastewater treatment clarifier having an effluent launder for withdrawal of effluent from the clarifier, the improvement comprising:

the clarifier having a peripheral clarifier wall, and the launder being connected to the inside of the clarifier wall, the launder being at least partly submerged below the liquid level in the clarifier, the launder having inlet orifices submerged below the liquid level of the clarifier, and the submerged launder comprising an inwardly/downwardly obliquely angled plate connected to the internal side of the clarifier wall as an upper side of the launder, a shelf connected to the clarifier wall at a level below the connection of the obliquely angled plate to the wall to form a bottom of the launder, the obliquely angled plate being connected to an inward side of the shelf, at a level such that the obliquely angled plate extends beyond the shelf to form a density current baffle for the clarifier, and the obliquely angled plate having said inlet orifices to admit effluent water from the clarifier.

2. The improvement described in claim 1, wherein the submerged effluent launder is formed by modification of an existing internal launder of the clarifier, with a vertical leg of the existing launder removed and said shelf comprising a remaining horizontal shelf of the existing launder.

3. The improvement described in claim 2, wherein a density current baffle is formed as an extension of and integral to the angled launder plate, extending over and beyond the inward edge of the horizontal shelf.

4. The improvement described in claim 1, further including vent holes near an upper end of the obliquely angled plate.

5. The improvement described in claim 1, further including an integral vertical plate extending up from the upper end of the obliquely angled plate, the vertical plate being secured to the clarifier wall, and the vertical plate extending up sufficiently to form a scum skimming surface above the liquid level in the clarifier.

6. The improvement described in claim 1, wherein the inlet orifices are just above the bottom of the launder, whereby the submerged orifices minimize sun exposure to prevent algae growth in the launder.

7. The improvement described in claim 1, wherein the obliquely angled plate is connected to the inward side of the shelf by threaded fasteners occurring at selected spacing, and wherein the inlet orifices are located in the obliquely angled plate above the threaded fasteners so as to provide tool access to the threaded fasteners through the orifices.

8. A method for converting a clarifier of a wastewater treatment system having an interior concrete effluent launder on the clarifier wall, generally L-shaped in cross section with a horizontal shelf and a vertical leg, to a submerged effluent launder, comprising:

removing the vertical leg of the launder, throughout the circumference of the clarifier, and attaching an obliquely angled plate onto the clarifier, to extend from an inward edge of the horizontal shelf obliquely up to a connection to the clarifier wall to thereby form a submerged launder triangular in cross section, and including orifices in the angled plate to admit clarifier effluent liquid, the launder being at least mostly submerged in the liquid of the clarifier.

9. The method of claim 8, wherein the obliquely angled plate has an integral vertical plate at its upper end, and including securing the integral vertical plate against the clarifier using bolts, to retain the obliquely angled plate and to provide a smooth surface for scum skimming.

10. The method of claim 8, further including providing a density current baffle as an extension of and integral to the obliquely angled plate, to extend over and beyond the inward edge of the horizontal shelf.

11. In a wastewater treatment clarifier having an effluent launder for withdrawal of effluent from the clarifier, the improvement comprising:

the clarifier having a peripheral clarifier wall, and the launder being connected to the inside of the clarifier wall, the launder being at least partly submerged below the liquid level in the clarifier, the launder having inlet orifices submerged below the liquid level of the clarifier, and the submerged launder comprising an inwardly/downwardly obliquely angled plate connected to the internal side of the clarifier wall as an upper side of the launder, a shelf connected to the clarifier wall at a level below the connection of the obliquely angled plate to the wall to form a bottom of the launder, the obliquely angled plate being connected to an inward side of the shelf, and the obliquely angled plate having said inlet orifices to admit effluent water from the clarifier.

12. The improvement described in claim 11, wherein the obliquely angled plate is connected to the inward side of the shelf by threaded fasteners occurring at selected spacing, and wherein the inlet orifices are located in the obliquely angled plate above the threaded fasteners so as to provide for use of a tool on the threaded fasteners through the orifices.

\* \* \* \* \*